United States Patent
Kret et al.

(10) Patent No.: US 9,280,212 B1
(45) Date of Patent: *Mar. 8, 2016

(54) VELOCITY BASED CONTENT DELIVERY

(71) Applicant: Google Inc., Mountain View, CA (US)

(72) Inventors: Ehren Andrew Kret, Sunnyvale, CA (US); Ronald Ho, Fremont, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/619,453

(22) Filed: Feb. 11, 2015

Related U.S. Application Data (63) Continuation of application No. 12/106,170, filed on Apr. 18, 2008, now Pat. No. 8,984,147.

(51) Int. Cl.
| | |
|---|---|
| *G06F 3/0346* | (2013.01) |
| *G06F 3/01* | (2006.01) |
| *G06F 17/30* | (2006.01) |
| *G08G 1/0968* | (2006.01) |

(52) U.S. Cl.
CPC .............. *G06F 3/0346* (2013.01); *G06F 3/017* (2013.01); *G06F 17/30867* (2013.01); *G08G 1/096833* (2013.01)

(58) Field of Classification Search
None
See application file for complete search history.

(56) References Cited

U.S. PATENT DOCUMENTS

| | | |
|---|---|---|
| 6,285,999 B1 | 9/2001 | Page |
| 2004/0059498 A1 | 3/2004 | Chinomi |
| 2004/0068439 A1 | 4/2004 | Elgrably |
| 2004/0104842 A1 | 6/2004 | Drury |
| 2007/0005419 A1* | 1/2007 | Horvitz et al. ............... 705/14 |
| 2007/0050248 A1 | 3/2007 | Huang |
| 2008/0195664 A1 | 8/2008 | Maharajh |
| 2009/0037273 A1 | 2/2009 | Zhu |

* cited by examiner

*Primary Examiner* — Jackie Zuniga Abad
(74) *Attorney, Agent, or Firm* — Foley & Lardner LLP; John D. Lanza; James De Vellis (57) ABSTRACT

Methods, systems, and apparatuses, including computer program products, may be used for content delivery. In particular implementations, methods, systems, and apparatuses may include the ability to identify that a content item request for a user device has been received, determine a position and velocity of the user device, select a content item to provide to the user device based at least on its position and velocity, and sending the content item to the user device.

20 Claims, 6 Drawing Sheets

VELOCITY BASED CONTENT DELIVERY

CROSS-REFERENCE TO RELATED APPLICATIONS

This application is a continuation application of, and claims priority to, U.S. patent application Ser. No. 12/106,170, titled "Velocity Based Content Delivery," filed on Apr. 18, 2008. The disclosure of the foregoing application is incorporated herein by reference in its entirety for all purposes.

BACKGROUND

The Internet has enabled access to a wide variety of content items, e.g., text, graphics, audio and/or video files, web pages for particular subjects, news articles, etc. Such access to these content items has likewise enabled opportunities for targeted advertising. For example, content items of particular interest to a user can be identified by a search engine in response to a user query. The query can include one or more search terms, and the search engine can identify and, optionally, rank the content items based on the search terms in the query and send the content items to the user (e.g., according to the rank). The query can also be an indicator of the type of information of interest to the user. By comparing the user query to a list of keywords specified by an advertiser, it is possible to provide targeted advertisements to the user.

Another form of online advertising is advertisement syndication, which allows advertisers to extend their marketing reach by distributing advertisements to additional partners. For example, third party online publishers can place an advertiser's advertisements on web pages that have content related to the advertisement. As the users are likely interested in the particular content on a publisher's webpage, they are also likely to be interested in the product or service featured in the advertisement. Accordingly, such targeted advertisement placement can help drive online customers to the advertiser's website.

Advertisers also distribute advertisements based on the location of a user. Typically, this involves sending the user advertisements for establishments that are in the current proximity of the user. The user's location can be approximated by using the WiFi Hot Spot serving the user device, the cell phone tower that the user device is accessing, or GPS measurements.

Advertisers often set budgets for their advertising costs, and the same is true for advertising on the web. The web also provides variables as to how often an advertisement may be presented. In some online advertising systems, for example, advertisers pay for their advertisements on a per-action basis, e.g., a cost-per-click (CPC) basis. The CPC of an identified advertisement can be multiplied by a performance metric, e.g., a click-through rate (CTR), for the advertisement to provide a value that is proportional to the cost of advertisement presentation.

SUMMARY

This disclosure generally relates to content delivery, which may be achieved through a variety of processes, systems, and apparatuses. In particular implementations, content delivery is based at least in part on the velocity of the user device for which the content is destined.

In one general aspect, a process for content delivery may include identifying that a content item request for a user device has been received, determining a position and velocity of the user device, and selecting a content item to provide to the user device based at least on its position and velocity. Selecting a content item may, for example, include analyzing the user device's location, speed, and direction of travel. The process may also include sending the content item to the user device. Sending the content item may, for example, include generating a message to convey the content item to the user device. Such a process may, for example, be performed by a machine, instructions on a computer readable medium, or other appropriate device.

The process may also include determining whether to provide a content item to the user device and determining the position and velocity if a content item may be provided. The content item may, for example, be a consumer-directed advertisement for a retail establishment.

Selecting a content item may include analyzing at least one additional state of the user device. An additional state may, for example, include time of day, duration of travel, and/or the roadway on which the user device is traveling.

Selecting a content item may also include determining whether data regarding a user or the associated user device may be used in selecting the content item (e.g., the user has opted in to data collection and/or use), and if the data may be used, the data is used in selecting a content item for the user device. Selecting a content item may additionally include determining whether data regarding a system associated with the user device is available, and if data regarding an associated system is available, using the data in selecting a content item for the user device. The associated system may, for example, be a vehicle, and the associated system data may include the fuel level of the vehicle.

Various implementations may include one or more features. For example, using velocity as at least one basis for selecting a content item may allow content items to be more appropriately targeted to users. Thus, users may obtain data that is more relevant to them, which can assist them in making selections, not to mention reducing unwanted data, which can be annoying, distracting, and costly. The use of other parameters may similarly facilitate this targeting. As another example, content item providers may be able to have their content items more narrowly targeted to users who have interest in the content, which can provide increased economic benefit to the content item providers.

The details of one or more implementations of the subject matter described in this specification are set forth in the accompanying drawings and the description below. Other features and aspects of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Content may be delivered to user devices based on a variety of parameters. In certain implementations, for example, a user device's position and velocity (i.e., speed and/or heading) may be used in selecting content items to provide to the user device. Other useful parameters may include time of day, travel duration, and/or the state of an associated system. These parameters may be useful in various combination with each other.

For example, if the content item is an advertisement, the relevancy of the advertisement for a search query may be determined by examining the position and velocity of the user device that issued the query because this may provide an indication of the desires of the associated user. For instance, a user traveling on an interstate may want to know about upcoming gas stations, fast food restaurants, and motels, but a user traveling in a city may want to know about retail shopping, service-oriented restaurants, dry cleaners, and hotels in the immediate vicinity.

The desires of the user may also be tied to information about which the user is searching. For example, if the user is specifically searching for information about restaurants in a city, then advertisements about restaurants can be targeted for the user. Of course, the position and velocity can be used to select (e.g., tailor and/or prioritize) the choices of restaurants advertised to the user.

The advertisements may be conveyed by pull-type or push-type techniques. For example, if a user is searching for advertisements regarding a particular merchant, the conveyed advertisements may be responses to a specific request from a user (e.g., a pull conveyance). As another example, if a party is generally searching for information regarding a subject (e.g., restaurants), accesses a page that has associated advertisements (e.g., a restaurant review page), or has indicated that they are generally indicated in receiving content items, the conveyed advertisements may be indirect responses to the user (e.g., a push conveyance). These advertisements may be context or targeted advertisements.

The selection may also be based on the past performance of advertisements for the area and/or current incentives. For example, certain advertisements may have a higher selection probability if other users have found the advertisements to be particularly useful, based, for example, on their use of the goods and/or services associated with the advertisements or on their feedback (e.g., a survey). Additionally, if certain merchants are offering special deals (e.g., discounts or coupons), the advertisements for those merchants may have a higher selection probability.

The selection may additionally be based on previously stored information about the associated user if, for example, the user has opted in for collection and/or use of this information. For example, if a user typically likes to dine at particular restaurants (e.g., McDonalds® versus Burger King®) or stay at particular motels (e.g., Holiday Inn® v. Courtyard®), then advertisements for these merchants may have a higher selection probability. In order to use stored user data in particular implementations, users may have to indicate that they would like this information to be used (e.g., through an opt-in program). If a user has not indicated that they would like to participate, the stored information about the user, if any, may be not be used.

Although various examples are described with reference to advertisements, the systems and processes described herein can also facilitate the selection and delivery of other types of content items having measurable performance or quality parameters, such as videos, articles, reviews, etc.

Figure 1:
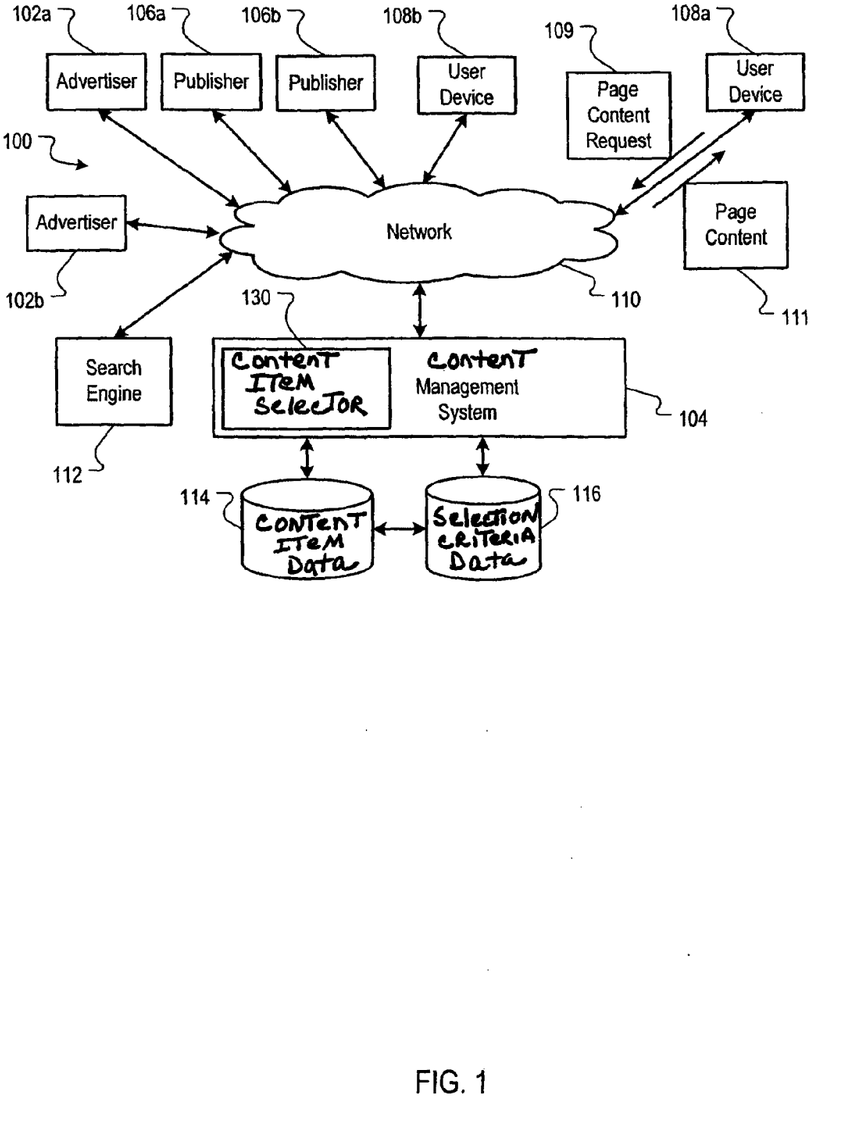
FIG. 1 is a block diagram illustrating one example of an online environment for content delivery.

Content delivery may, for example, be implemented in an online environment, such as the example online environment 100 shown in FIG. 1. The online environment 100 can facilitate the selection and delivery of content items, e.g., web pages, advertisements, etc., to users. A network 110, such as a local area network (LAN), a wide area network (WAN), a cellular telephone network, the Internet, or a combination thereof, connects advertisers 102a and 102b, an content management system 104, publishers 106a and 106b, user devices 108a and 108b, and a search engine 112. Although only two advertisers (102a and 102b), two publishers (106a and 106b) and two user devices (108a and 108b) are shown, the online environment 100 may include many thousands of advertisers, publishers and user devices.

In the online environment 100, one or more advertisers 102a and/or 102b can directly, or indirectly, enter, maintain, and track advertisement information in a content management system 104. The content items can be in the form of graphics, such as banner advertisements, text, audio, video and/or any other appropriate type of electronic advertisement 120. The content items may also include embedded information, such as a links, meta-information, and/or machine executable instructions, such as HTML or JavaScript™.

A user device, such as user device 108, can submit a page content request 109 to a publisher 106 or the search engine 112. In some implementations, the page content 111 can be provided to the user device 108a in response to the request 109. The page content can include content items provided by the content management system 104 and/or can include executable instructions, e.g., JavaScript™, that can be executed at the user device 108 to request content items from the content management system 104. Example user devices 108 include personal computers, mobile communication devices, television set-top boxes, personal digital assistants, mobile information devices, etc.

Advertisements can also be provided from the publishers 106. For example, one or more publishers 106 can submit advertisement requests for one or more advertisements to the system 104. The system 104 responds by sending the advertisements to the requesting publisher 106a or 106b for placement on one or more of the publisher's web properties (e.g., websites and other network-distributed content). The advertisements can include embedding links landing pages, e.g., pages on the advertisers 102 websites, that a user is directed to when the user clicks an advertisement presented on a publisher website. The advertisement requests can also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, a publisher 106 can combine the requested content with one or more of the advertisements provided by the system 104. This combined page content 109 and advertisements can be sent to the user device 108 that requested the content (e.g., user device 108a) as page content 111 for presentation in a viewer (e.g., a browser or other content display system). The publisher 106 can transmit information about the advertisements back to the content management system 104, including information describing how, when, and/or where the advertisements are to be rendered (e.g., in HTML or JavaScript™).

Publishers 106 can include general content servers that receive requests for content (e.g., articles, discussion threads, music, video, graphics, search results, web page listings, information feeds, etc.), and retrieves the requested content in response to the request. For example, content servers, related news content providers, retailers, independent blogs, social network sites, or any other entity that provides content over the network 110 can be a publisher.

Advertisements can also be provided through the use of the search engine 112. The search engine 112 can receive queries for search results. In response, the search engine 112 can retrieve relevant search results from an index of documents (e.g., from an index of web pages). An exemplary search engine 112 is described in the article S. Brin and L. Page, "The Anatomy of a Large-Scale Hypertextual Search Engine," Seventh International World Wide Web Conference, Brisbane, Australia and in U.S. Pat. No. 6,285,999. Search results can include, for example, lists of web page titles, snippets of text extracted from those web pages, and hypertext links to those web pages, and may be grouped into a predetermined number of (e.g., ten) search results.

The search engine 112 can also submit a request for advertisements to the system 104. The request may include a number of advertisements desired. This number may depend on the search results, the amount of screen or page space occupied by the search results, the size and shape of the advertisements, etc. The request for advertisements may also include the query (as entered or parsed), information based on the query (such as geo-location information, whether the query came from an affiliate and an identifier of such an affiliate), information associated with, or based on, the search results, and information regarding the user device issuing the query (e.g., position and velocity). Such information may include, for example, identifiers related to the search results (e.g., document identifiers or "dociDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search engine 112 can combine the search results with one or more of the advertisements provided by the system 104. This combined information can then be forwarded to the user device 108 that requested the content as the page content 111. The search results can be maintained as distinct from the advertisements, so as not to confuse the user between paid advertisements and presumably neutral search results.

The advertisers 102, user devices 108, and/or the search engine 112 can also provide usage information to the content management system 104. This usage information can include measured or observed user behavior related to advertisements that have been delivered, such as, for example, whether or not a conversion or a selection related to an advertisement has occurred. The system 104 performs financial transactions, such as crediting the publishers 106 and charging the advertisers 102 based on the usage information. Such usage information can also be processed to measure performance metrics, such as a click-through rate ("CTR"), conversion rate, and other measurable performance metrics.

A click-through can occur, for example, when a user of a user device, selects or "clicks" on a link to a content item returned by the publisher or the advertising management system. The CTR is a performance metric that is obtained by dividing the number of users that clicked on the content item, e.g., a link to a landing page, an advertisement, or a search result, by the number of times the content item was delivered. For example, if a link to a content item is delivered 100 times, and three persons click on the content item, then the CTR for that content item is 3%. Other usage information and/or performance metrics can also be used.

A "conversion" occurs, for example, when a user consummates a transaction related to a previously served advertisement. What constitutes a conversion may vary from case to case and can be determined in a variety of ways. For example, a conversion may occur when a user clicks on an advertisement, is referred to the advertiser's web page, and consummates a purchase there before leaving that web page. A conversion can also be defined by an advertiser to be any measurable/observable user action such as, for example, downloading a white paper, navigating to at least a given depth of a Website, viewing at least a certain number of web pages, spending at least a predetermined amount of time on a web site or web page, registering on a web site, etc. Other actions that constitute a conversion can also be used.

In addition to using content such as a search query or web page content of a publisher to select advertisements, advertisements can also be selected using other selection processes, such as an auction. In one implementation, the content management system 104 includes an auction process. Advertisers 102 may be permitted to select, or bid, an amount the advertisers are willing to pay for each click of an advertisement, e.g., a cost-per-click amount an advertiser pays when, for example, a user clicks on an advertisement. The cost-per-click can include a maximum cost-per-click, e.g., the maximum amount the advertiser is willing to pay for each click of advertisement based on a keyword. For example, advertisers A, B, and C all select, or bid, a maximum cost-per-click of $0.50, $0.75, and $1.00, respectively. The maximum amount advertiser A will pay for a click is $0.50, the maximum amount advertiser B will pay is $0.75, and the maximum amount advertiser C will pay is $1.00.

The position, or rank, of an advertisement, such as where the advertisement is displayed next to search results or in which slot an advertisement will be displayed on a publisher page, can be a function of the cost-per-click multiplied by a quality score associated with the advertisement. A quality score can be the basis for measuring the quality and relevance of an advertisement. The quality score can, for example, be determined by the advertisement's click-through rate, the relevance of the advertisement text, overall historical keyword performance, and the user experience on a landing page associated with the advertisement. Other parameters can also be used to determine a quality score.

The rank of an advertisement that is displayed can be determined, for example, by multiplying the maximum cost-per-click for the advertisement by a quality score of the advertisement. The advertisement can then be placed among other advertisements in order of increasing or decreasing rank. For example, suppose the quality score of advertisers A, B, and C are "3," "1," and "1," respectively. The rank of advertiser A, B, and C can be determined as follows:

$A$: Rank=quality score×maximum cost-per-click=3.0× $0.50=1.50

$B$: Rank=quality score×maximum cost-per-click=1.0× $0.75=0.75

$C$: Rank=quality score×maximum cost-per-click=1.0× $1.00=1.00

The advertisers can be ranked as follows:
1. A
2. C
3. B

The advertisements, associated usage data, and bidding parameters described above can be stored as advertisement data in an content item data store 114. In general, content item data store 104 can store content items that can be presented in a content item presentation. Example content item presentations include advertisements being presented on a web page, a list of video being presented for selection on a web page, a list of articles for being presented on a web page, etc.

The content management system 104 can further manage the delivery of advertisements by using selection criteria to select one or more advertisements to provide in response to a data request. The selection criteria can be stored in a selection criteria data store 116, which can, for example, specify when, where, and under what conditions particular advertisements may be delivered. For example, a gas station company may design an advertising campaign for new goods (e.g., hot food) and/or services (e.g., car wash). The selection criteria may include the products and/or services sought and the location of the gas station. As another example, a gas station may want to offer a discount on drinks (e.g., coffee) at a certain time of day (e.g., morning), which could be relevant to searches for coffee and/or searches that occur in the morning. Such data defining the selection criteria can be stored in the data store 116. Additionally, advertiser's budgets could be taken into consideration.

In some implementations, the selection criteria can be on historical performance of advertisements. For example, a historical click-through rate of an advertisement, a historical conversion rate associated with an advertisement, or some combination of these historical rates and/or other rates, may provide an indication that other user found these advertisements to be of value. Additionally, user reviews associated with advertisements (e.g., very good coffee), could be used.

The content items and their selection criteria can be submitted to the content item selector 130, which can, in turn, determine which content items to present in the content item presentation. For example, if the content items are advertisements, the content item selector 130 can be an engine that identifies advertisements most relevant to a data request.

In some modes of operation, when content management system 104 determines that an advertisement is needed for a user device (e.g., by receiving a data request from the user device or a request from a search engine, a web application, or a publisher), the content management system determines a position and velocity for the user device. Determining the position and velocity for the user device may include analyzing data in a content item request or data request, requesting data from the user device, or accessing previously stored data regarding a device's position. Position data from the user device may, for example, be from GPS measurements made by the user device. In particular implementations, a user may need to indicate their permission to user position and/or velocity before it may be used (e.g., through an opt-in program).

Content management system 104 may also determine whether other data is available. For example, the content management system may also determine whether other state data regarding the user device (e.g., time of day of the request, travel duration of the user device, or roadway of travel) is available or whether any data regarding a system associated with the user device (e.g., a vehicle) is available. A roadway may, for example, be determined by linking the user device's position and velocity to a mapping application. For cases in which the associated system is a vehicle, for instance, a user device may communicate with the vehicle through wireline connections, (e.g., Ethernet or USB), wireless connections (e.g., Bluetooth or Wireless Ethernet), or otherwise to determine any appropriate type of data regarding the vehicle (e.g., fuel level, velocity, duration of travel, or final destination). Data regarding the user device or the associated system may be included or derived from a request or requested from the user device.

In particular implementations, content management system 104 may determine whether it is permissible to use data regarding a user associated with a user device. This determination may involve checking whether the user has previously provided permission to use associated user data and/or requesting permission from the user. Associated user data may, for example, include previous selections made by the user, previous preferences specified by the user, data that is contained in the data request (e.g., the user is searching for gas stations), or previous routes taken by the user (e.g., one-shot pass through an area or repeat traveler). The associated user data may, for example, be stored in a database regarding the user.

Using the position and velocity for the user device that initiated a data request, along with any of the other available and permissible data, content management system 104 may select one or more content items for the user. For example, using the user device's position and velocity and the time that the user device issued the data request may allow selection of a potentially relevant advertisement for the user device's user (e.g., an advertisement for a motel if the user device is moving at high speed down an interstate at night versus an advertisement for a coffee shop if the user device is moving slowly down a city street in the morning). Using the user device's position and velocity and data regarding an associated user may also allow selection of a potentially relevant advertisement (e.g., an advertisement for a type of restaurant that the associated user frequents and is on the user device's path versus a randomly selected restaurant on the user device's path or all the restaurants on the user device's path). Moreover, if it is known that the user regularly travels this path, different advertisements (e.g., repeat customer discounts or larger incentives) may be offered. Additionally, if the user device's destination is known (e.g., from a query to a mapping application), a merchant along the user device's route may be found. Note that the route need not be the same as the current heading. Similarly, using the user device's position and velocity and data regarding a system associated with the user device may allow selection of a potentially relevant advertisement (e.g., an advertisement for a gas station on the user device's path if an associated vehicle is low on gas versus an advertisement for a restaurant and/or a merchant along the user device's route if destination data is available from a vehicle's navigation system). The parameters may also be utilized in various other combinations to make the selection. The selected content item(s) may be any appropriate type of information (e.g., text, graphics, audio, or video) for presentation to a user.

In making the selection, content item selector 130 may use data regarding content items from selection criteria data store 116. Data store 116 may contain a variety of data regarding content items. For example, the data store may include data defining the relevant type, geographic location, time of day, pricing data, and discounts for an advertisement. By comparing the data associated with the data request to the data in data store 116, content item selector may determine which advertisements, if any, correspond to a data request.

Additionally, if a large number of content items correspond to a data request, content item selector 130 may further determine which of the corresponding content items to select. For example, if only a limited number of content items may be used, content item selector 130 may select the content items that best correspond to the data request (e.g., based on location, price, and/or user preferences, if permissible). As another example, if there are several types of content items that correspond to a data request (e.g., gas stations, restaurants, and motels), the content item selector may select the best correspondence for each type.

Once the appropriate content items have been selected, content management system 104 may generate a message for conveying the selected content items to the user device. A content item may be conveyed by itself or as part of another piece of information (e.g., a web page or a map) and may be conveyed directly to the user device or through another component (e.g., a search engine or web application). The content item may be designed for presentation to the user by itself or as part of the other piece of information. For example, if a user is accessing a web-based mapping program, advertisements can be conveyed as text feeds or icons to assist in recognition. If an icon is of interest, it can be selected and then displayed. Moreover, directions may be automatically provided and coupons may be presented, which can be physically presented (e.g., in paper form) or electronically presented (e.g., by download or image scan) at the merchant. This may assist in reducing distraction of the user from other tasks.

Advertisements may also be accompanied by additional data. For example, the mileage and projected arrival time may accompany an advertisement to provide the user additional information.

The content management system 104 can be implemented on one or more computers. An example computer is discussed below with respect to FIG. 5. The management system 104 may, however, may be only one aspect of what a computer is executing. Thus, an implementing computer may execute various other processes (e.g., a web site or a search engine).

As discussed, system 100 provides the ability for content items to be more appropriately targeted to users. Thus, users may obtain data that is more relevant, which can assist them in making selections and reducing unwanted data. Moreover, providers of content items may be able to have their content items more narrowly targeted to users who have interest in them, which can provide increased economic benefit to the content item providers.

Figure 2:
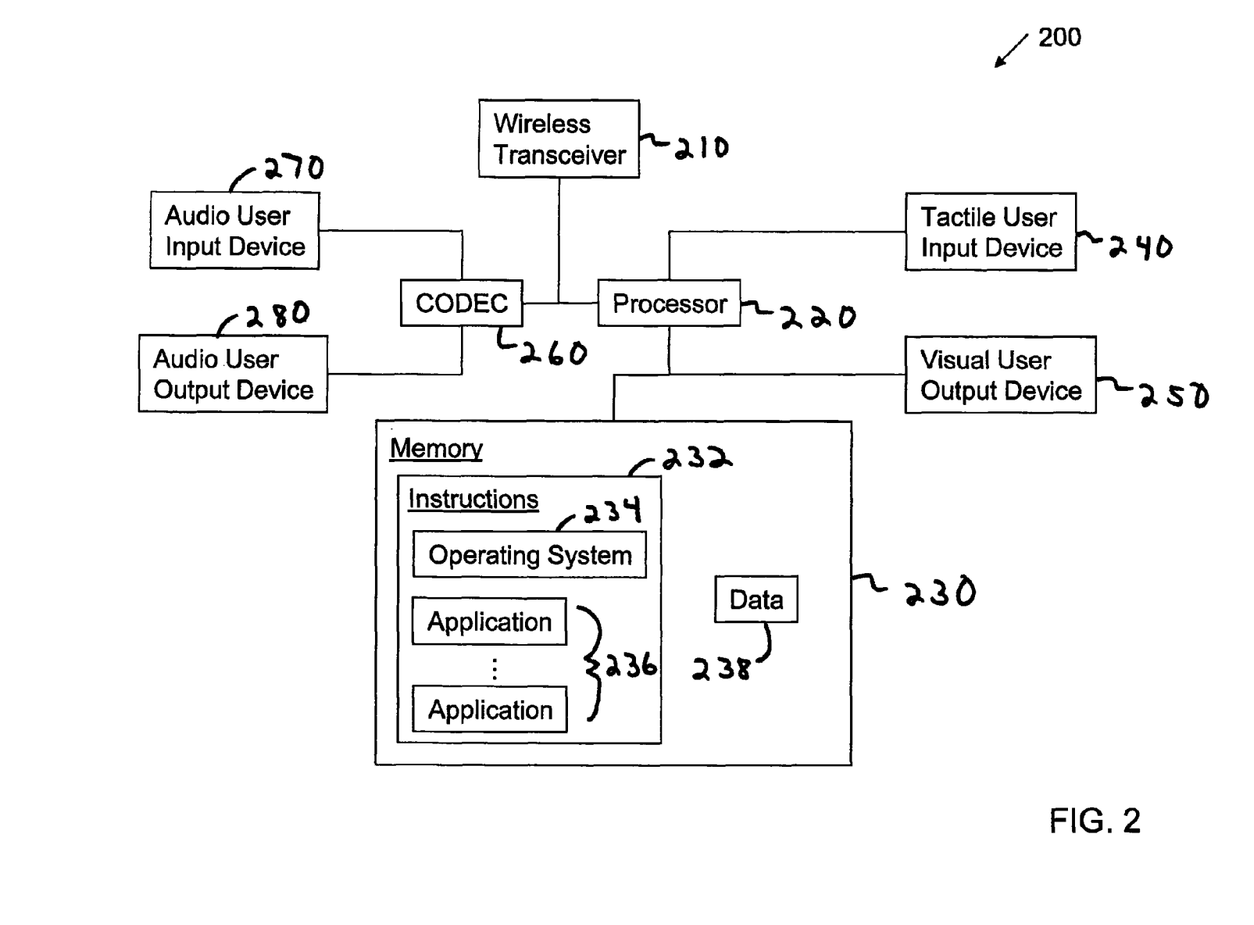
FIG. 2 is a block diagram illustrating one example of a user device for content delivery.

FIG. 2 illustrates one example of a user device 200 for delivering content to a user. User device 200 may, for example, be useful in a system such as system 100.

User 200 includes a wireless transceiver 210, a processor 220, and memory 230. Transceiver 210 is operable to send and receive wireless messages and data and for user device 200. Transceiver 210 may operate according to any appropriate wireless technique (e.g., infrared (IR) or radio frequency (RF)) and may use any appropriate communication protocol (e.g. IRDA, IS-95, IS-136, WCDMA, IEEE 802.11, or IEEE 802.16). Processor 220 processes data received by transceiver 210 and also provides data to transceiver 210. Processor 220 may, for example, include a microprocessor, a microcontroller, a digital signal processor, and/or any other appropriate device for manipulating information in a logical manner. Processor 220 may have internal instructions, but typically also operates according to instructions 232 in memory 230, which may include random access memory, read only memory, programmable read only memory, and/or any other appropriate devices for storing information. Instructions 232 include an operating system 234 (e.g., Windows®, Linux, or Unix®) and one or more applications 236 (e.g. a web browser). Memory 230 also stores data 238 for the applications 236.

User device 200 also includes a tactile user input device 240 (e.g., a keyboard, a keypad, a touch pad, or a stylus) and a visual user output device 250 (e.g., a display screen). By using input device 240, a user may convey commands and data to processor 220, and by using output device 250, the processor may provide instructions and data to the user.

User device 200 additionally includes a coder/decoder (CODEC) 260, and an audio user input device 270 (e.g., a microphone) and an audio user output device 280 (e.g., a speaker). CODEC 260 is responsible for encoding audible signals from a user into an acceptable format for processor 220 or wireless transceiver 210 and for decoding signals from processor 220 or wireless transceiver 210 for output device 280. By using CODEC 260, input device 270, and output device 280, a user may issue audible commands and data to and/or audibly receive instructions and data from processor 220 and/or conduct a conversation with another party through wireless transceiver 210.

In one mode of operation, when the user device 200 determines that a user desires to convey a data request (e.g., by receiving a command through input device 240), processor 220 generates a message (e.g., an HTTP request, a search, or a query) for conveying the data request to a remote computer (e.g., a server) that may satisfy the request. The request may for example, be entered through an application such as a web browser (e.g., Internet Explorer or Navigator) or through a toolbar (e.g., from Google or Yahoo). The remote computer may, for example, be running a search engine and/or a web site.

The user device may then wait for a response to the data request and/or continue to perform other operations. When a response to the data request is received, the user device provides the data to the user, typically through the visual output device 250, or possibly through the audio output device 280. The response may include a selected content item, and this may be provided to the user through the same device that provides the response or through another device.

Along with reviewing with the data response, the user can choose whether the review to the content item. For example, the user can read the content item, open the content item, or activate a link for the content item. The user device 200 can then provide more data regarding the content item or issue requests for and provide more data regarding the content item.

As illustrated, user device 200 may embody many of the features of a cellular telephone. Other user devices may also be useful with system 100, however, such as personal computers, notebook computers, personal digital assistants, or any other type of computing device, regardless of whether or not it has the same or different set of input and output features of user device 200.

User device 200 may request and/or present content items with or without specially downloaded instructions for advertisements. For example, content items may be requested and presented through a general web browser. As another example, user device 200 may have specially downloaded instructions for requesting and presenting advertisements. The downloaded instructions may take any of a variety of forms, such as a stand-alone software application or a script. In some implementations, the downloaded instructions may determine when to initiate a request based on actions at the user device (e.g., when a user floats a new map tile or selects a certain group of data for review).

Figure 3:
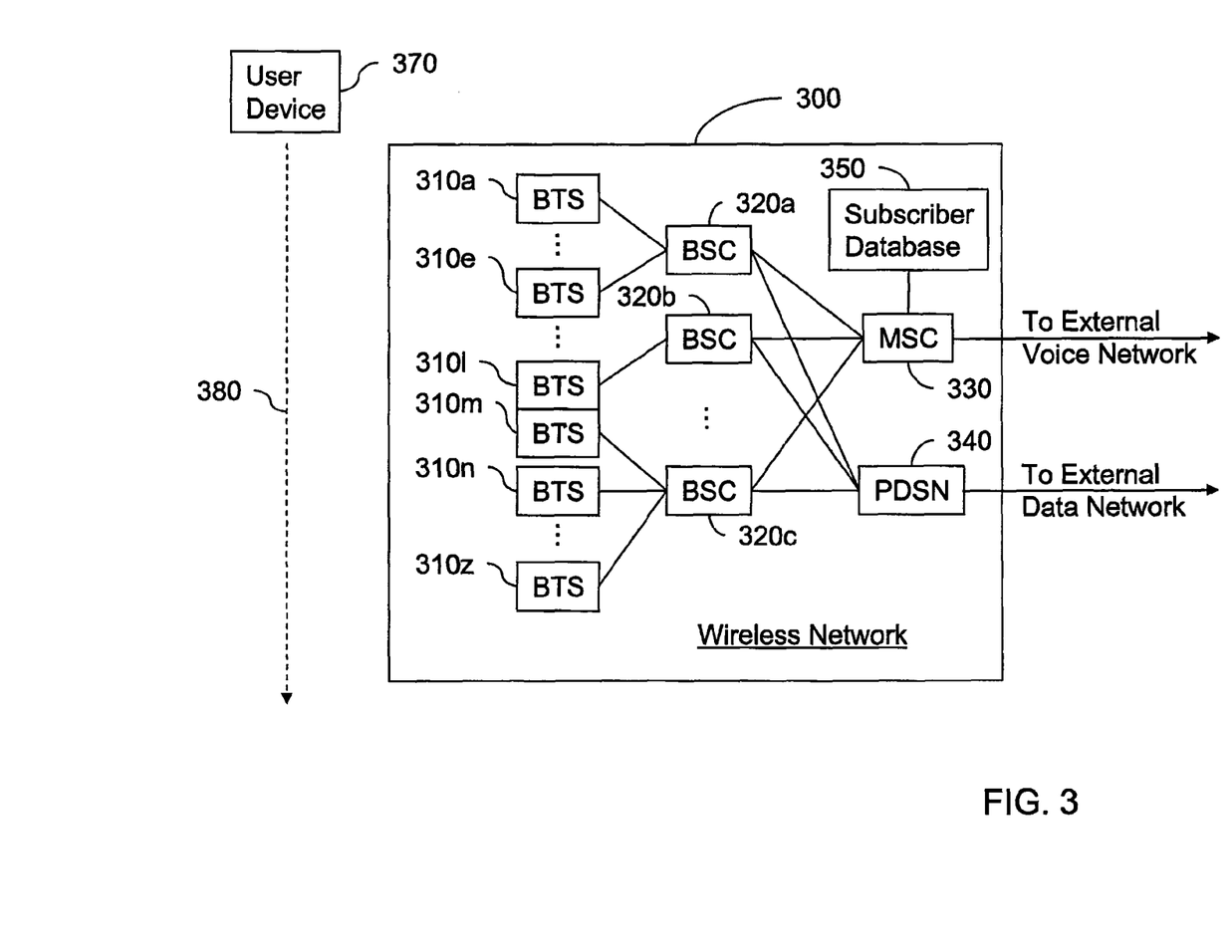
FIG. 3 is a block diagram illustrating one example of a network for content delivery.

FIG. 3 illustrates a wireless network 300 for content delivery. Wireless network 300 is operable to wirelessly receive data from a user device and convey it to other devices within the wireless network or to user devices in other appropriate networks. Wireless network 300 may, for example, be used in a system such as system 100.

In more detail, wireless network 300 includes base transceiver stations (BTSs) 310, base station controllers (BSCs) 320, a mobile switching center (MSC) 330, and a packet data serving node (PDSN) 340. BTSs 310 are responsible for the actual conveyance of wireless electromagnetic signals from and to wireless user devices (one of which is illustrated as user device 370). The signals could contain any type of information. BSCs 320, in turn, are responsible for analyzing messages, which could contain any type of information (e.g., voice or data), from wireless user devices and sending them to the appropriate one of MSC 330 and PDSN 340. Additionally, BSCs 320 are responsible for analyzing messages from MSC 330 and PDSN 340 and sending them to the appropriate one of BTSs 310. Each of BSCs 320 is coupled to one or more of BTSs 310.

MSC 330 is responsible for establishing wireless network sessions with wireless user devices and conveying voice messages within wireless network 300 or to an external voice network, such as, for example, a public switched telephone network (PSTN). Additionally, MSC 330 is responsible for handling handoffs between BTSs 310 if a wireless user device moves between them during a session (in the direction of arrow 380, for example).

To accomplish its functions, MSC 330 is coupled to a subscriber database 350. Subscriber database 350 may contain any appropriate information about a subscriber, such as for example, available service plan and validation data. An entry for a user in the subscriber database may be established when the user registers for wireless services and may be updated as needed. In particular implementations subscriber database 350 is a home location register (HLR).

PDSN 340, in turn, is responsible for conveying data within wireless network 300, including to and from other wireless user devices. Additionally, PDSN 340 may send data to and receive data from an external data network, such as for, example, the Internet, so that data may be sent to and received from other devices, including web sites, search engines, and user devices.

In certain implementations, network 300 may assist with determining the location and/or velocity of user devices. For example, an approximation of a user device's location and velocity may be determined by using a number of cell tower identifiers. As another example, using cell tower triangulation may provide a refined approximation of a user device's location, and a series of the measurements may provide an indication of velocity.

Figure 4:
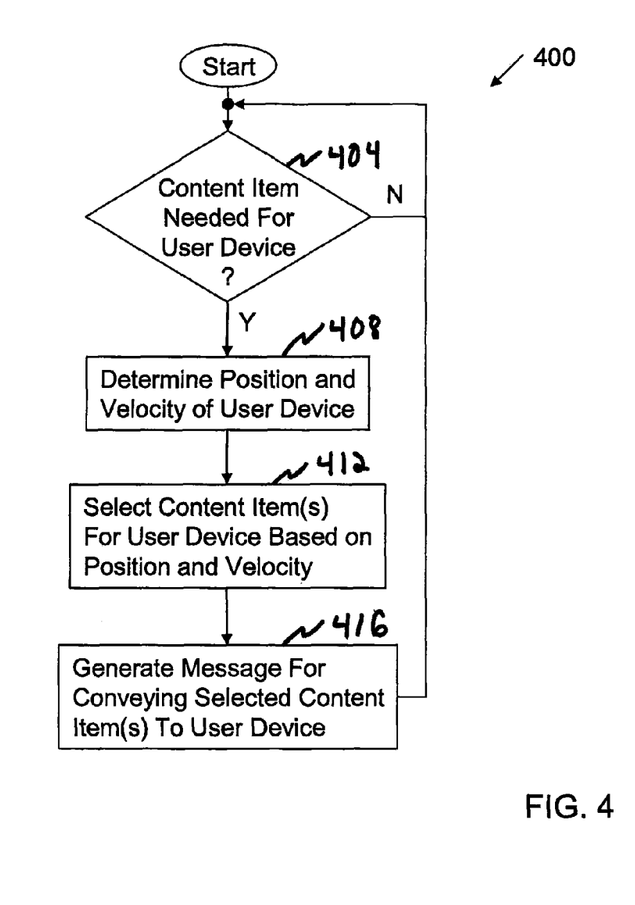
FIG. 4 is a flow diagram illustrating one example of a process for content delivery.

FIG. 4 illustrates one implementation of a process 400 for content delivery. Process 400 may, for example, be implemented by a content management system such as content management system 104 in system 100. Process 400 may, for example, represent the operations of a software program, loop, subroutine, sub-program, or thread.

Stage 404 waits to receive a request for a content item for a user device. A request may, for example, be in response to a query to a search engine, the accessing of a web site, the accessing of a web application (e.g., a mapping program), or a specific request for a content item. Alternatively, the request may be inferred (e.g., fuel tank is low, a timer has expired, or other automatic prompt). The request can be received by, for example, a content management system. When a content item request is received for a user device, a position and velocity for the user device is determined (408). Determining the position and velocity may include analyzing data in the data request, requesting data from the user device, or accessing previously stored data regarding a device's position. In particular implementations, the position data may be from GPS measurements made by the user device. The position and velocity can be determined by, for example, a content item selector.

One or more content items are selected for the user device based on the device's position and velocity (412). For example, using the device's position and velocity may allow the selection of a potentially relevant advertisement for the user device's user. For instance, user's traveling at a high rate of speed may have different needs than those traveling slowly. Moreover, user's traveling at a high rate of speed may typically want items that are ahead of them and close to their travel direction, while those traveling slowly may not be so geographically constrained. The content item may be any appropriate type of information (e.g., text, graphics, audio, or video) for presentation to a user and may, for example, be located in a content item data store. Selection can be performed by, for example, a content item selector.

A message is then generated for conveying the selected content item(s) to the user device (416). A content item may be conveyed by itself or as part of another piece of information (e.g., a web page or a map). The content item may be designed for presentation to the user by itself or as part of the other piece of information. A message for conveying the selected content item(s) may, for example, be generated by a content management system.

Although FIG. 4 illustrates one example of a process for content delivery, other processes for content delivery may include fewer, additional, and/or a different arrangement of operations. For example, a process may not wait until receiving a data request from a user device before determining the user device's position and velocity. As an additional example, other parameters regarding a user device, such as time of day, duration of travel, or destination, or a system associated with the user device may also be used in selecting a content item. Additionally, in particular implementations, data regarding a user associated with the user device may be used in selecting the user device. As a further example, generating a message for conveying the selected content item need not be part of the process. As another example, one or more operations may occur in a contemporaneous and/or simultaneous manner.

Figure 5:
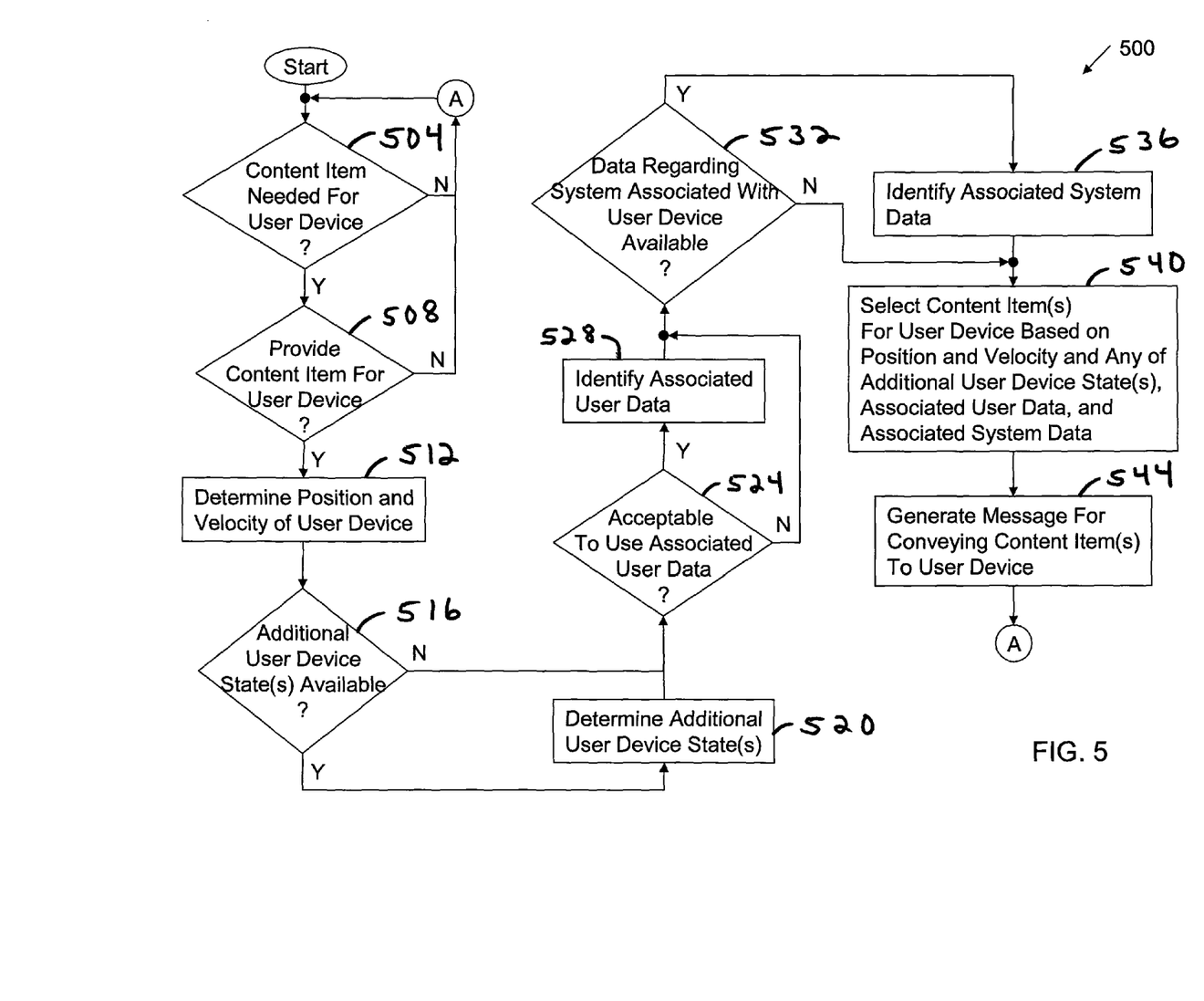
FIG. 5 is a flow diagram illustrating one example of a process for content delivery.

FIG. 5 illustrates another implementation of a process 500 for content delivery. Process 500 may, for example, be implemented by a content management system such as content management system 104 in system 100. Process 500 may, for example, represent the operations of a software program, loop, subroutine, sub-program, or thread.

Stage 504 waits to receive a request for a content item for a user device. A request may, for example, be in response to a query to a search engine, the accessing of a web site, the accessing of a web application (e.g., a mapping program), or a specific request for a content item. Alternatively, the request may be inferred (e.g., fuel tank is low, a timer has expired, or other automatic prompt). The request can be received by, for example, a content management system. When a content item request is received for a user device, it is determined whether it is appropriate to provide a content item for the user device (508). It may not be appropriate to provide a content item for a user device, for example, if the user device has indicated that it does not desire content items, there is an indication that the user device cannot process content items, or the user has not indicated that it is permissible to use his position and/or velocity information (e.g., through an opt-in selection). The determination may, for example, be accomplished by a content management system.

If it is not appropriate to provide a content item for the user device, stage 504 continues with waiting for another request for a content item for a user device. If, however, it is appropriate to provide a content item for the user device, a position and velocity for the user device is determined (512). Determining the position and velocity for the user device may include analyzing data in the data request, requesting data from the user device, (e.g., GPS measurements), or accessing previously stored data regarding a device's position. The position and velocity can be determined by, for example, a content item selector.

Whether one or more additional user device states are available is also determined (516). The additional user device states may, for example, include time of day of a data request or travel duration of the user device. The additional user device state(s) can be determined by, for example, a content item selector. If an additional user device state is available, the additional state is determined (520). A state may, for example, be included or derived from a data request or requested from the user device. The additional user device state can be determined by, for example, a content item selector.

Once any additional state of the user device has been determined, or if no additional state is available, whether it is acceptable to use data regarding a user associated with the user device is determined (524). This determination may involve checking whether the user has previously provided permission to use associated user data and/or requesting permission from the user. Associated user data may, for example, include previous selections made by the user, previous preferences specified by the user, or data that is contained in the data request (e.g., the user is searching for gas stations). Whether it is acceptable to use data regarding a user can be determined by, for example, a content item selector. If associated user data may be used, the associated user state can be identified (528). The associated user data may, for example, be stored in a database regarding the user and can be identified by, for example, a content item selector.

Once any information regarding the user has been identified, or if no information regarding the user may be used, whether data regarding a system associated with the user device is available can be determined (532). An associated system may, for example, be a vehicle in which the user device is being transported or of which the user device is a part. A user device may communicate with a vehicle through wireline connections, wireless connections, or otherwise. In particular implementations, a user device can receive messages from the vehicle's controller area network (CAN). Whether data regarding an associated system is available can be determined by, for example, a content item selector. If data regarding a system associated with the user device is available, the data is identified (536). For cases in which the associated system is a vehicle, for example, the data may indicate the fuel level in the vehicle, the duration of travel of the vehicle, or the final destination of the vehicle. The data regarding the system can be determined by, for example, a content item selector.

Once any information regarding an associated system has been identified, or if no information regarding an associated system has been identified, one or more content items for the user device can be selected based on the device's position and velocity and one or more of an additional state regarding the user device, data regarding an associated user, and data regarding an associated system (540). For example, using the user device's position and velocity and the time that the user device issued the data request may allow selection of a potentially relevant advertisement for the user device's user (e.g., an advertisement for a motel if the user device is moving at high speed down an interstate at night versus an advertisement for a coffee shop if the user device is moving slowly down a city street in the morning). Using the user device's position and velocity and data regarding a user associated with the user device may also allow selection of a potentially relevant advertisement (e.g., an advertisement for a type of restaurant that the associated user frequents and is on the user device's path versus a randomly selected restaurant on the user device's path or all the restaurants on the user device's path). Similarly, using the user device's position and velocity and data regarding a system associated with the user device may allow selection of a potentially relevant advertisement (e.g., an advertisement for a gas station on the user device's path if an associated vehicle is low on gas versus an advertisement for a restaurant). The parameters may also be utilized in various other combinations to make the selection. The content items can be selected by, for example, a content item selector, and the selected content item(s) may be any appropriate type of information (e.g., text, graphics, audio, or video) for presentation to a user.

A message for conveying the selected content item(s) to the user device may be generated (544). A content item may be conveyed by itself or as part of another piece of information (e.g., a web page or a map). The content item may be designed for presentation to the user by itself or as part of the other piece of information. A message may be generated by, for example, a content management system.

Although FIG. 5 illustrates one example of a process for content delivery, other processes for content delivery may include fewer, additional, and/or a different arrangement of operations. For example, a process may not wait until receiving a data request for a user device before determining the user device's position and velocity. As another example, various parameters may not be used and, hence, need not be checked. As a further example, the parameters may be checked in various orders. As a further example, generating a message for conveying the selected content item need not be part of the process. As an additional example, one or more operations may occur in a contemporaneous and/or simultaneous manner.

Figure 6:
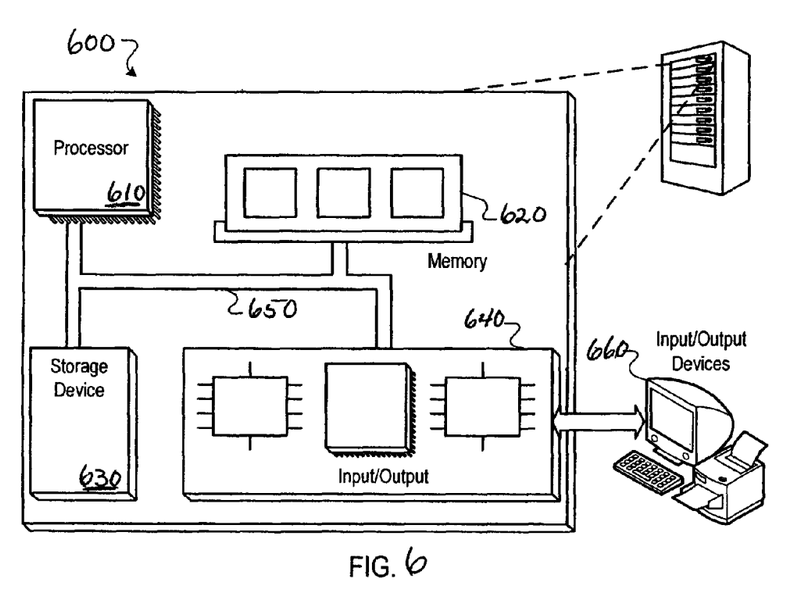
FIG. 6 is a block diagram illustrating one example of a computing system for content delivery.

FIG. 6 illustrates one example computer system 600. The system 600 includes a processor 610, a memory 620, a storage device 630, and an input/output device 640. Each of the components 612, 620, 630, and 640 can, for example, be interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can, for example, include a hard disk device, an optical disk device, or some other large capacity storage device.

The input/output device 640 provides input/output operations for the system 600. In one implementation, the input/output device 640 can include one or more of a network interface devices, e.g., an Ethernet card, a serial communication device, e.g., and RS-232 port, and/or a wireless interface device (e.g., an 802.11 card). In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

The content management system 104 can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium. The content management system 104 can be distributively implemented over a network, such as a server farm, or can be implemented in a single computer device.

Implementations of the above subject matter and the functional operations can be achieved in digital electronic circuitry, or in computer software, firmware, or hardware, including the structures disclosed in this specification and their structural equivalents, or in combinations of one or more of them. Implementations of the subject matter described in this specification can be achieved as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain implementations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all embodiments, and it should be understood that the described program components and systems can generally be integrated together in a single software product or packaged into multiple software products.

Particular implementations of the subject matter described in this specification have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples while still achieving content delivery.

What is claimed is:

1. A method performed by a data processing apparatus, the method comprising:
    receiving data specifying (i) a velocity at which a user device is moving and (ii) a direction in which the user device is moving;
    identifying at least one content item category based on the velocity;
    determining that the velocity exceeds a velocity threshold;
    in response to determining that the velocity exceeds the velocity threshold, selecting a content item that is associated with the at least one content item category and that corresponds to a location that is:
        within a threshold distance of a path along which the user device is moving; and
        in the direction in which the user device is moving along the path; and
    providing data that cause presentation of the content item at the user device.

2. The method of claim 1, further comprising receiving a content item request from the user device, wherein the content item is selected and provided in response to the content item request.

3. The method of claim 1, further comprising:
    receiving data specifying a query submitted by the user device, wherein selecting the content item comprises:
        identifying a set of content items responsive to the query; and
        identifying a subset of the content items that correspond to a location that is:
            within a threshold distance of the path on which the user device is moving; and
            in the direction in which the user device is moving along the path; and
        selecting the content item from the subset of content items.

4. The method of claim 3, wherein selecting the content item from the subset of content items comprises selecting the content item based on a performance of the content items of the subset in an area in which the user device is located.

5. The method of claim 1, wherein selecting the content item comprises selecting the content item based on at least one of (i) an amount of time for which the user device has been traveling, (ii) a time of day at which the content item is to be provided, (iii) a type of path along which the user device is moving, or (iv) a destination of the user device.

6. The method of claim 1, wherein selecting the content item comprises selecting the content item based on a status of a vehicle in which the user device is traveling.

7. The method of claim 6, wherein the status of the vehicle comprises an amount of fuel in a fuel tank of the vehicle.

8. A system comprising:
    a data processing apparatus; and
    a non-transitory computer readable storage medium encoded with a computer program, the program comprising data processing apparatus instructions that when executed by the data processing apparatus cause the data processing apparatus to perform operations comprising:
        receiving data specifying (i) a velocity at which a user device is moving and (ii) a direction in which the user device is moving;
        identifying at least one content item category based on the velocity;
        determining that the velocity exceeds a velocity threshold;
        in response to determining that the velocity exceeds the velocity threshold, selecting a content item that is associated with the at least one content item category and that corresponds to a location that is:
            within a threshold distance of a path along which the user device is moving; and
            in the direction in which the user device is moving along the path; and
        providing data that cause presentation of the content item at the user device.

9. The system of claim 8, wherein the operations further comprise receiving a content item request from the user device, wherein the content item is selected and provided in response to the content item request.

10. The system of claim 8, wherein the operations further comprise:
    receiving data specifying a query submitted by the user device, wherein selecting the content item comprises:
        identifying a set of content items responsive to the query; and
        identifying a subset of the content items that correspond to a location that is:
            within a threshold distance of the path on which the user device is moving; and
            in the direction in which the user device is moving along the path; and
        selecting the content item from the subset of content items.

11. The system of claim 10, wherein selecting the content item from the subset of content items comprises selecting the content item based on a performance of the content items of the subset in an area in which the user device is located.

12. The system of claim 8, wherein selecting the content item comprises selecting the content item based on at least one of (i) an amount of time for which the user device has been traveling, (ii) a time of day at which the content item is to be provided, (iii) a type of path along which the user device is moving, or (iv) a destination of the user device.

13. The system of claim 8, wherein selecting the content item comprises selecting the content item based on a status of a vehicle in which the user device is traveling.

14. The system of claim 13, wherein the status of the vehicle comprises an amount of fuel in a fuel tank of the vehicle.

15. A non-transitory computer storage medium encoded with a computer program, the program comprising instructions that when executed by one or more data processing apparatus cause the data processing apparatus to perform operations comprising:
   receiving data specifying (i) a velocity at which a user device is moving and (ii) a direction in which the user device is moving;
   identifying at least one content item category based on the velocity;
   determining that the velocity exceeds a velocity threshold;
   in response to determining that the velocity exceeds the velocity threshold, selecting a content item that is associated with the at least one content item category and that corresponds to a location that is:
      within a threshold distance of a path along which the user device is moving; and
      in the direction in which the user device is moving along the path; and
   providing data that cause presentation of the content item at the user device.

16. The non-transitory computer storage medium of claim 15, wherein the operations further comprise receiving a content item request from the user device, wherein the content item is selected and provided in response to the content item request.

17. The non-transitory computer storage medium of claim 15, wherein the operations further comprise:
   receiving data specifying a query submitted by the user device, wherein selecting the content item comprises:
      identifying a set of content items responsive to the query; and
      identifying a subset of the content items that correspond to a location that is:
         within a threshold distance of the path on which the user device is moving; and
         in the direction in which the user device is moving along the path; and
      selecting the content item from the subset of content items.

18. The non-transitory computer storage medium of claim 17, wherein selecting the content item from the subset of content items comprises selecting the content item based on a performance of the content items of the subset in an area in which the user device is located.

19. The non-transitory computer storage medium of claim 15, wherein selecting the content item comprises selecting the content item based on at least one of (i) an amount of time for which the user device has been traveling, (ii) a time of day at which the content item is to be provided, (iii) a type of path along which the user device is moving, or (iv) a destination of the user device.

20. The non-transitory computer storage medium of claim 15, wherein selecting the content item comprises selecting the content item based on a status of a vehicle in which the user device is traveling.

* * * * *